3,155,002
MOVABLE PROJECTOR AND SCREEN
COMBINATION
Angelo M. Sorrentino, 7351 Dorcas St., Philadelphia, Pa.
Filed Dec. 15, 1961, Ser. No. 159,653
1 Claim. (Cl. 88—28)

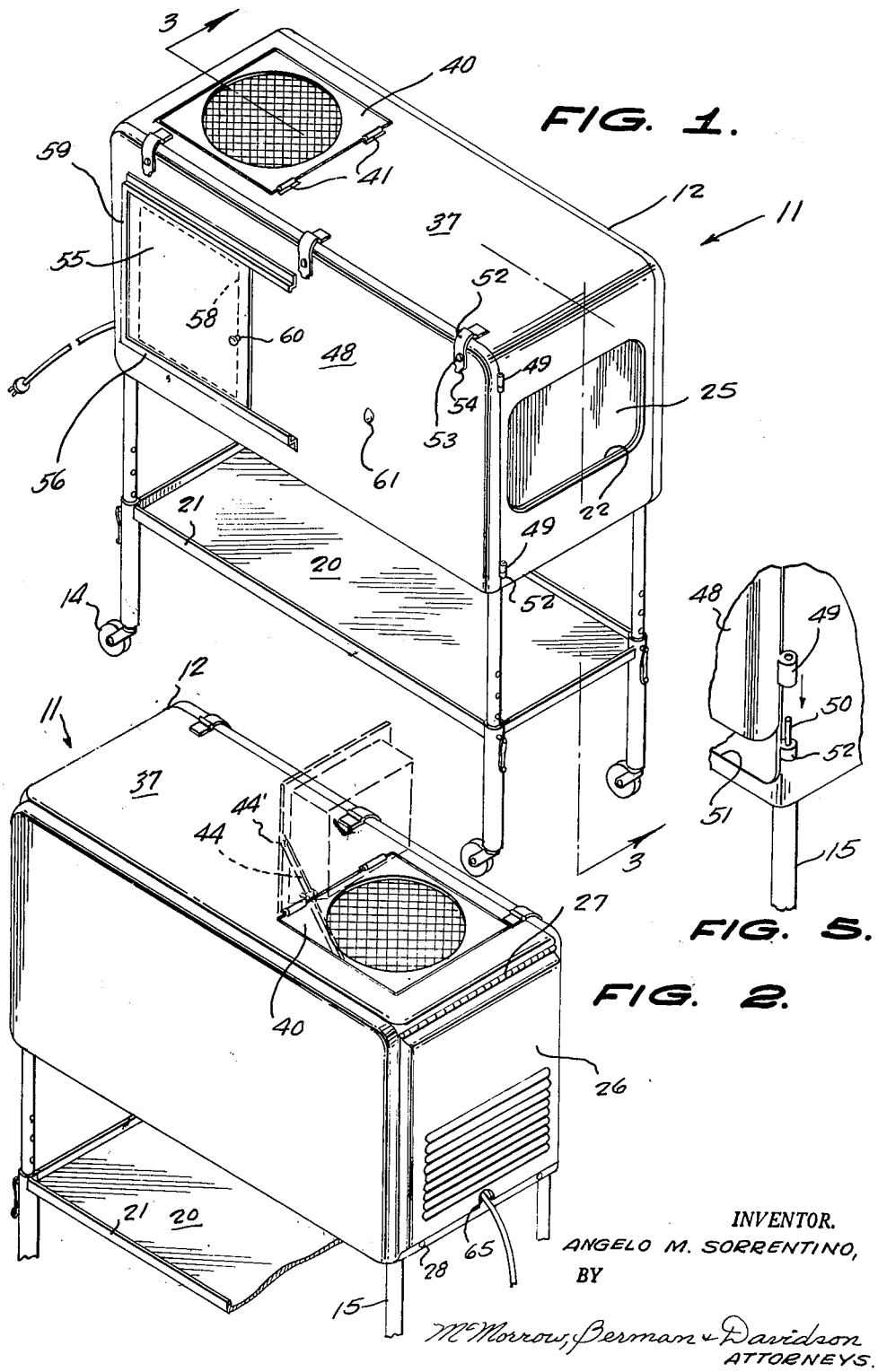

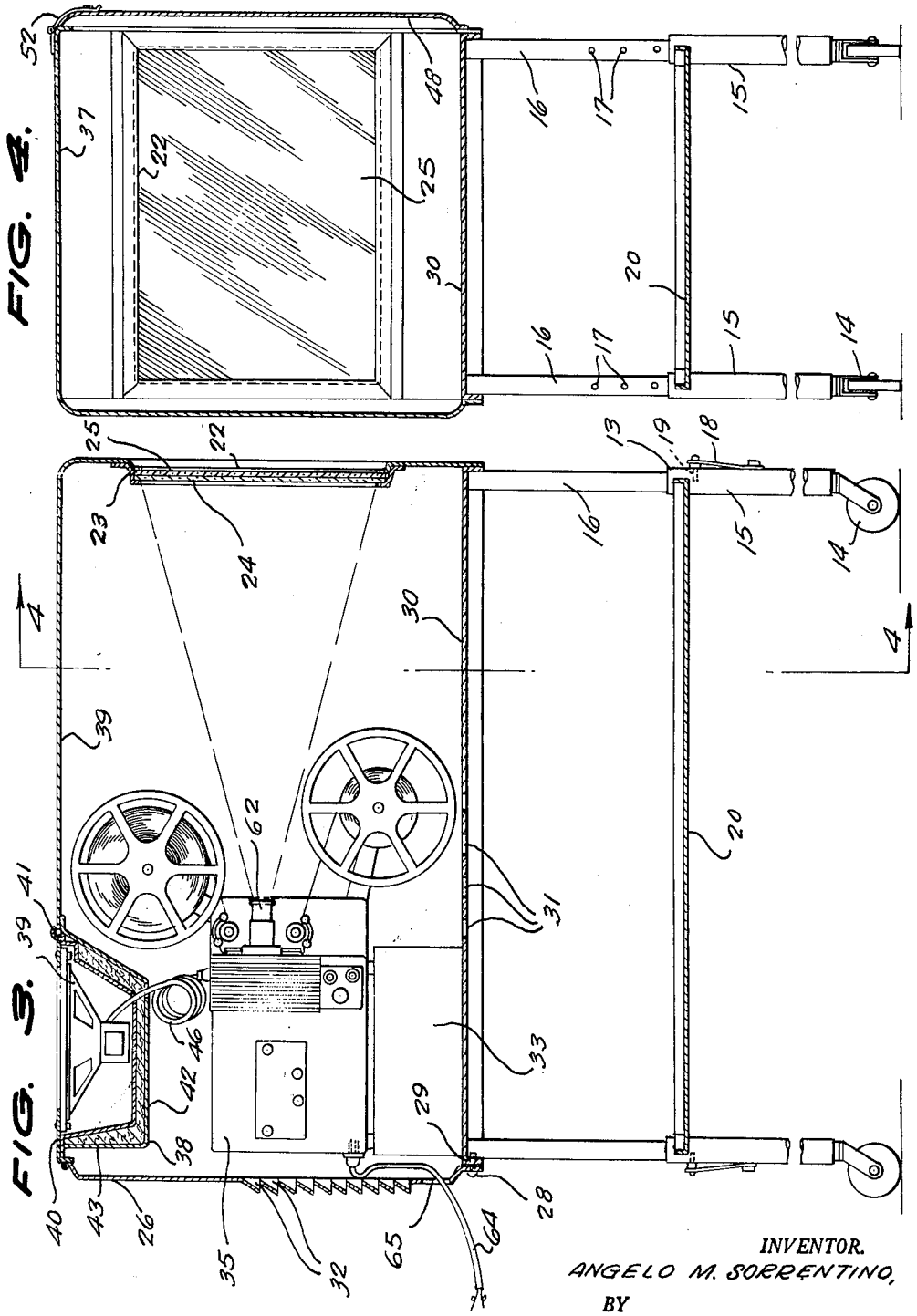

This invention relates to motion picture projection apparatus, and more particularly to a portable sound motion picture exhibiting device of the type containing its own projection screen.

The main object of the invention is to provide a novel and improved sound motion picture exhibiting device which is relatively simple in construction, which is completely self-contained, and which is easy to operate.

A still further object of the invention is to provide an improved portable sound motion picture exhibiting device of the type containing its own projection screen, the device being relatively inexpensive to manufacture, being easily accessible for the installation of the motion picture projection unit thereof and for the removal thereof, and for the threading of motion picture film on the reels of the projector, the device being relatively easily adjusted in height and being provided with efficient means for ventilating the same.

A still further object of the invention is to provide an improved portable sound motion picture exhibiting device of the type containing its own projection screen and sound reproducing loud speaker, the device being neat in appearance, being relatively compact in size, and being durable in construction.

A still further object of the invention is to provide an improved sound motion picture exhibiting device provided with its own projection screen, picture projector, and sound reproducing speaker, the picture projector and reproducing speaker being readily removable for independent use if so desired.

A still further object of the invention is to provide an improved sound motion picture exhibiting device provided with its own projection screen, picture projector and sound reproducing device, the exhibiting device being highly portable so that it can be readily moved from place to place, providing a bright positive image which can be viewed under ordinary lighting conditions, being easy to adjust to proper focus, and maintaining its focusing adjustment for long periods of time since the distance to the screen from the projection lens remains substantially constant.

Further objects and advantages of the invention will become apparent from the following description and claim, and from the accompanying drawings, wherein:

FIGURE 1 is a perspective view of an improved portable sound motion picture exhibiting device constructed in accordance with the present invention.

FIGURE 2 is a fragmentary rear perspective view of the exhibiting device of FIGURE 1, illustrating the manner in which the sound producing loudspeaker element thereof may be raised to an upstanding position for projecting sound forwardly.

FIGURE 3 is a longitudinal vertical cross sectional view taken substantially on the line 3—3 of FIGURE 1.

FIGURE 4 is a transverse vertical cross sectional view taken substantially on the line 4—4 of FIGURE 3.

FIGURE 5 is an enlarged fragmentary perspective view showing the manner in which the removable side wall of the main housing of the device may be raised to detach same.

Referring to the drawings, the sound motion picture exhibiting device is designated generally at 11 and comprises a horizontally elongated, generally rectangular main housing 12 which is supported on depending vertically adjustable corner legs 13 provided with the swiveled supporting casters 14 enabling the housing to be readily moved around to different locations. Each of the legs 13 comprises a bottom sleeve 15 to the lower end of which a swiveled caster 14 is attached, the sleeve 15 telescopically receiving the upper portion 16 of the leg. Said upper portion 16 is provided with spaced apertures 17 and the associated sleeve 15 is provided with a spring arm 18 to the end of which is secured a locking pin 19 which is engageable through an aperture in the sleeve 15 with a selected aperture 17 of the associated upper leg portion 16, whereby to lock the leg in adjusted position. Thus, the housing 12 may be readily adjusted to any desired height within the range of adjustment afforded by the apertures 17.

Rigidly secured to the upper portions of the lower sleeve 15 is a rectangular tray 20 provided with an upstanding marginal flange 21, enabling various articles to be supported thereon, such as reels of film, spare parts, and various other accessories associated with the exhibiting device.

At its forward end the housing 12 is provided with a rectangular window 22 which is inwardly offset and which has secured thereto a frame 23 in which is mounted a translucent viewing screen 24, the screen 24 being covered at its front surface with a transparent protective window 25 of glass, or the like. Since the frame 23 containing the viewing screen 24 and the protective window 25 are offset inwardly from the front plane of the housing, these elements are thus made less susceptible to accidental contact with projecting objects, and thus are protected against breakage.

The housing 12 is provided with the hinged rear wall 26, the rear wall being provided with a horizontally extending top transverse hinge 27 whereby it may be swung rearwardly and upwardly to provide access to the rear portion of the interior of the housing, when desired. The hinged rear wall 26 is normally held closed by the provision of removable fastening screws 28 engaged through its bottom margin and threadedly engaged in a depending flange 29 provided at the rear end of the bottom wall 30 of housing 12. Said bottom wall 30 is provided at its intermediate portion with a plurality of air inlet openings 31, and the rear wall 26 is provided with the horizontally louvered openings 32 to allow air to discharge from the interior of the housing. It will be seen from FIGURE 3 that ventilating air may enter the housing through the bottom opening 31 and may circulate through the rear portion of the housing, leaving the housing through the downwardly directed louvered openings 32. As will be further apparent from FIGURE 3, the downwardly directed louvers associated with the openings 32 are of sufficient length to shield the openings so that light rays will be prevented from emerging horizontally from the rear wall of the housing.

Secured on the rear portion of the bottom wall 30 of the housing is a supporting base 33 adapted to support a conventional sound motion picture projector 35 in the manner illustrated in FIGURE 3, the projector being arranged so that it projects images onto the translucent screen 24, illuminating same and allowing the images to be viewed from the front of the device through the protective transparent window 25.

The top wall 37 of housing 12 is formed at its rear portion with a downwardly convergent recess 38 in which is normally received a sound reproducing loud speaker 39, the loud speaker unit being provided with the baffle wall 40 which is detachably connected by conventional separable hinge assemblies 41 to the forward transverse margin of the generally rectangular downwardly convergent recess 38. The well or recess 38 is provided with a lining of fireproof sound-insulating material 42, and the sound reproducing loud speaker 39 is contained within a protective housing 43 which is adapted to nest within the housing 38 and engage the sound insulating fireproof layer 42 in the manner illustrated in FIGURE 3. Thus, the speaker housing 43 may normally be disposed in the recess 38 with the baffle element 40 thereof in a horizontal position substantially flush with the top wall 37.

As shown in FIGURE 2, in dotted view, the speaker housing may be rotated upwardly to a vertical upstanding position with the sound reproducing loud speaker 39 directed forwardly, a hinged supporting link 44 connecting the intermediate portion of one side margin of the loud speaker housing 43 with the intermediate portion of a side edge of the recess 38, the hinged link 44 being of a conventional type adapted to support the speaker housing in the upstanding position illustrated in dotted view in FIGURE 2. The conventional hinged link 44 may be readily folded to allow the speaker housing 43 to be lowered into the recess 38 so that it may assume the full line position thereof shown in FIGURE 2, with the baffle wall 40 substantially flush with the top wall 37.

The separable hinge assemblies 41 are of a conventional type similar to those employed with the detachable covers of portable typewriters. The hinged supporting link 44 is detachably connected to the intermediate portion of the side margin of the speaker housing 43 by a readily removable pivot screw 44'. When this screw is removed, the loud speaker may be detached from top wall 37 and may be removed for independent use with other equipment.

As shown in FIGURE 3, the sound reproducing loud speaker is connected by a suitable cable 36 to the output of the amplifier associated with the sound system of the motion picture projector 35.

The housing 12 is provided with a removable side wall 48 so that access may be obtained to the interior of the housing from the side, for example, for placing the projector 35 in the housing, for threading motion picture film on the reels of the projector, or for other necessary operations requiring free access to the interior of the housing. The side wall 48 is provided at the top and bottom portions of its side margins with a pair of vertically aligned vertical loop elements 49, 49 engageable on upstanding vertical pins 50 rigidly secured to the upper and lower portions of the side margins of a rectangular side opening 51 extending substantially for the full area of the side of housing 12, the removable wall 48 thus serving as a cover for the opening 51. As shown in FIGURE 5, the sleeve elements 49 may be engaged on the upstanding pins 50, being supported on enlarged lug portions 52 provided at the bases of the pins 50, whereby the side wall 48 will be supported in closing relationship with respect to the opening 51 in the position thereof illustrated in FIGURE 1. Hinged resilient fastening clips 52 are provided on the side marginal portion of top wall 37, said resilient clip members 52 being of a conventional type and being apertured to receive locking studs 53 projecting from the side wall 48 so as to lock said side wall in its closed position. The clips 52 are provided with finger tabs 54 which may be employed to elevate said clips to disengage them from the locking studs 53, whereby the side wall 48 will be then free to be elevated so as to disengage the sleeves 49 from the pins 50, thus allowing the side wall 48 to be removed from the housing. This provides free access to the interior of the housing for any required purpose, as abovementioned.

The side wall 48 is further provided with a sliding closure 55 comprising a plate member which is slidably supported in a frame 56 secured to the exterior surface of the wall 48, the wall being apertured, as shown in dotted view at 58, to define an access opening which may be exposed by sliding the plate member 55 to the right, as viewed in FIGURE 1. As shown in FIGURE 1, the frame 56 is generally Z-shaped in transverse cross section and defines guide tracks engaging the top and bottom margins of the slidable closure member 55. At its rear end the frame includes a vertical portion 59 serving as a stop means for limiting rearward movement of the closure plate 55 to a position wherein it covers the opening 58. The closure plate 55 is provided with a spring detent catch 60 which is lockingly engageable in a recess 61 provided in the forward portion of the side wall 48 to hold the closure plate in its open position, namely, in a position wherein the access opening 58 is exposed.

The access opening 58 provides sufficient access to the interior of the housing 12 to perform various adjustments such as focusing the projection lens assembly 62 of the motion picture projector 35, or the like.

As shown in FIGURE 3, the line cord 64, associated with the projector 35 extends through a U-shaped notch 65 provided in the bottom edge of the hinged rear wall 26 of housing 12.

In operation, the projector 35 provides images on the translucent screen 24 which are directly viewable from the front of the device through the transparent window 25. Therefore, the motion picture film employed with the projector 35 must be of the reversed type, namely, of a type reversed from that which is employed in connection with the usual type of motion picture projector wherein the image is projected on a screen located a substantial distance forwardly from the projector.

The sound material is transmitted from the amplifier associated with the sound motion picture projector 35 to the loud speaker 39, and preferably the loud speaker housing 43 is elevated to its upstanding position, shown in dotted view in FIGURE 2, so that the sound is projected forwardly from the device.

While a specific embodiment of an improved sound motion picture exhibiting device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A sound motion picture exhibiting device comprising a horizontally elongated housing having a plurality of wheeled telescopically adjustable supporting legs, said housing having a ventilated rear portion adapted to receive a sound motion picture projector, and inwardly offset screen supporting frame mounted in the forward end wall of said housing, a translucent viewing screen mounted in said frame and adapted to display pictures projected from said projector, said housing being provided with a removable side wall affording access to the interior of the housing when removed, said housing being formed with a recess in the rear portion of its top wall, a layer of sound-insulating material in the recess, a sound reproducing loud speaker unit hinged on a transverse horizontal axis to the forward margin of said recess and being normally receivable in said recess in a horizontal position, said loud speaker unit being rotatable to an upstanding forwardly facing substantially vertical position, and hinged link means connecting a side margin of the loud speaker unit to a side margin of the recess and being adapted to support the loud speaker in said upstanding position.

References Cited in the file of this patent
UNITED STATES PATENTS

| | | |
|---|---|---|
| 1,832,821 | Sponable | Nov. 17, 1931 |
| 2,291,931 | Troeger | Aug. 4, 1942 |
| 2,370,587 | Shapiro et al. | Feb. 27, 1945 |